May 12, 1953

A. O. WILLIAMS 2,638,058

RAIL CAR TRUCK

Filed July 9, 1948

*INVENTOR.*
ALFRED O. WILLIAMS
BY
ATTY.

May 12, 1953

A. O. WILLIAMS 2,638,058

RAIL CAR TRUCK

Filed July 9, 1948

INVENTOR.
ALFRED O. WILLIAMS
BY
ATTY.

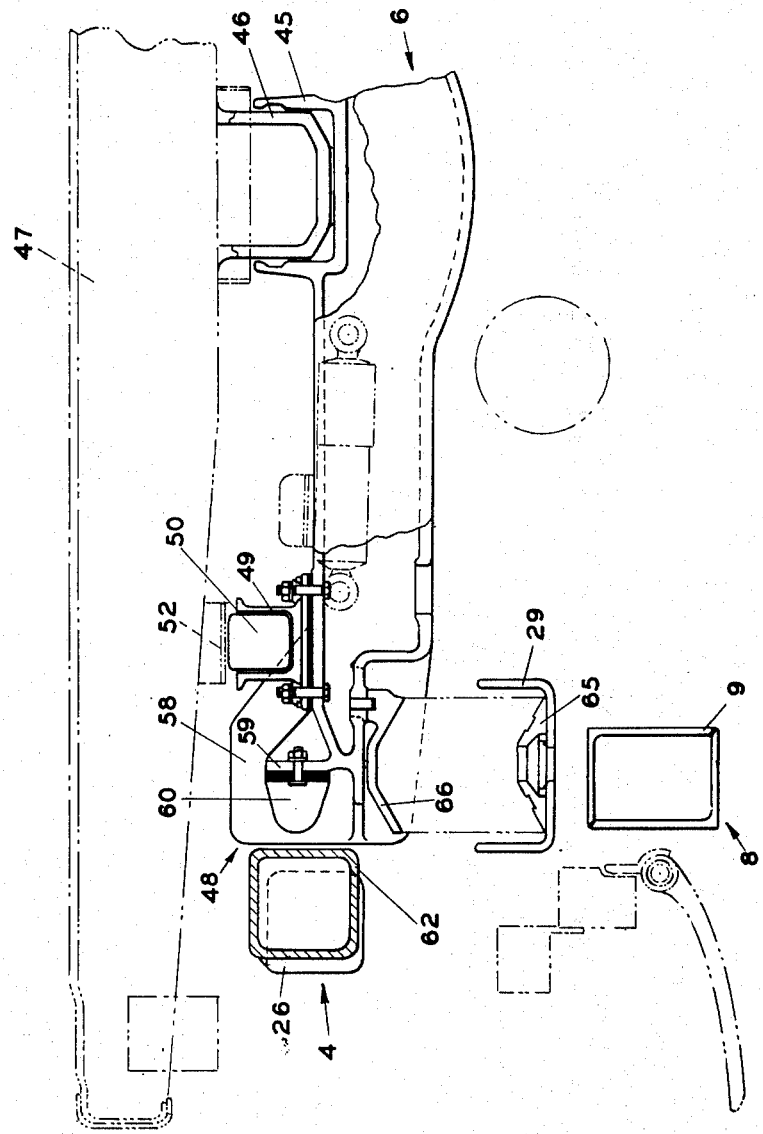

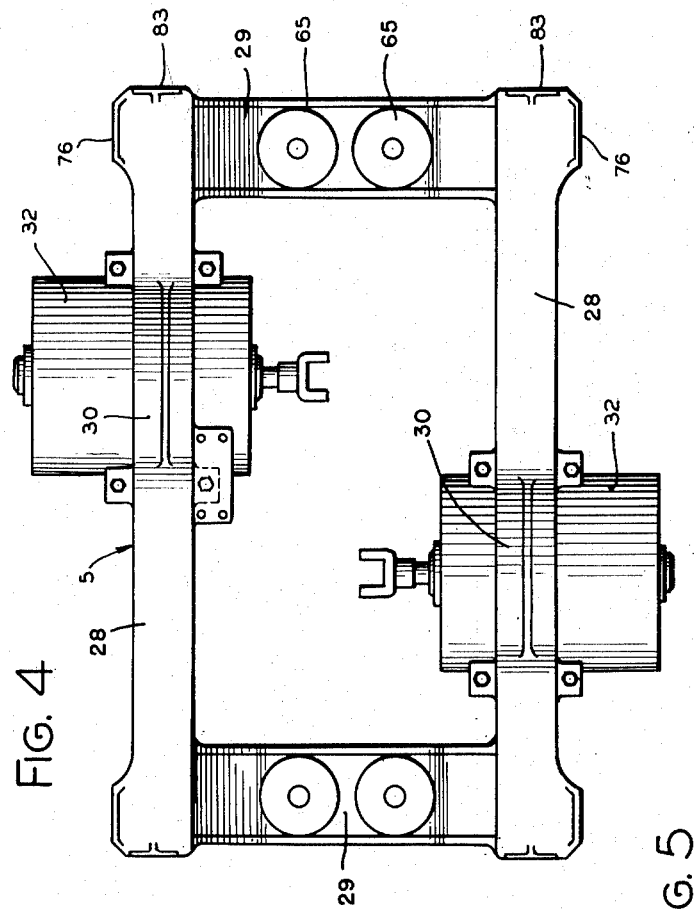
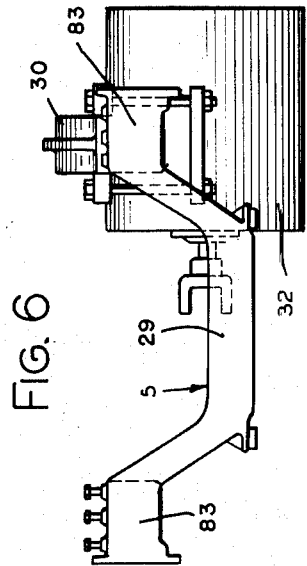
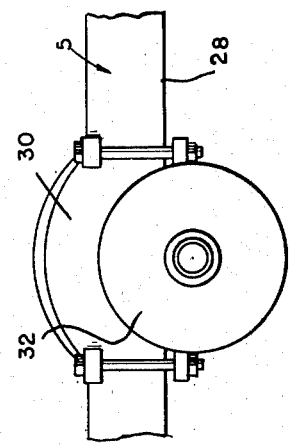
*INVENTOR.*
ALFRED O. WILLIAMS
BY
ATTYS.

Patented May 12, 1953

2,638,058

UNITED STATES PATENT OFFICE 2,638,058

RAIL CAR TRUCK

Alfred O. Williams, Battle Creek, Mich., assignor to Clark Equipment Company, Buchanan, Mich., a corporation of Michigan Application July 9, 1948, Serial No. 37,926

7 Claims. (Cl. 105—193)

My present invention relates to rail car trucks, and more particularly, is concerned with rail car trucks for use with street, elevated and subway cars.

The rail car truck of my present invention is of the type shown and described in my copending application, Serial No. 11,411, filed February 27, 1948, now U. S. Patent No. 2,561,549, and is an improvement of the truck of that application.

In my above noted application there is disclosed a rail car truck comprising a pair of axles having wheels mounted thereon, which axles are held in fixed parallel relation by a substantially rectangular main frame comprising side frame members disposed outwardly of the outboard sides of the wheels. The main frame supports a cradle or sub-frame which, in turn, provides for the support of a bolster upon which the car body is mounted. The arrangement is such that the cradle or sub-frame is resiliently mounted for vertical movement on the main frame and the ends of the bolster are, in turn, resiliently mounted for vertical movement in the cradle or sub-frame. Also, suitable rubber cushioning means are provided between the main frame and bolster ends to limit and absorb lateral and transverse movement of the bolster relative to the main frame.

It is an object of my present invention to provide improved mounting means for the cradle or sub-frame of a rail car truck of the type noted having suitable resilient means for limiting and cushioning lateral and transverse movement of the cradle or sub-frame relative to the main frame.

A preferred feature of my invention is to provide a cradle or sub-frame substantially rectangular in plan and extending transversely between the side frame members of the truck, together with resilient means at the sides and ends of the corners of the sub-frame or cradle and adjacent portions of the main frame for limiting and cushioning transverse and lateral movement of the cradle or sub-frame relative to the main frame.

A further preferred feature resides in the provision of resilient means of the type comprising a plurality of alternate metal and rubber plates arranged in a stack extending vertically between the ends of the bolster and depending portions at the ends of the sub-frame or cradle, and also extending vertically between the corners of the bolster and the main frame. Such resilient means, in addition to providing for cushioning of the main frame, sub-frame or cradle, and bolster vertically relative to each other, also further serve to limit relative horizontal movement of these parts relative to each other and provide a truck in which irregularities or shocks imparted to the wheels of the vehicle are not transmitted to the car body supported by the bolster.

The above and other objects, features and advantages of my invention will appear from the detail description.

Now in order to acquaint those skilled in the art with the manner of constructing and utilizing rail car trucks in accordance with my present invention, I shall describe in connection with the accompanying drawings a preferred embodiment of my invention.

In the drawings:

Figure 3 is a vertical sectional view taken substantially along the line 3—3 of Figure 1 looking in the direction indicated by the arrows;

Figure 4 is a plan view of the sub-frame of the rail car truck of Figure 1;

Figure 5 is a partial side elevational view of the sub-frame of Figure 4; and

Figure 6 is an end elevational view of the sub-frame of Figure 4.

Figure 1:
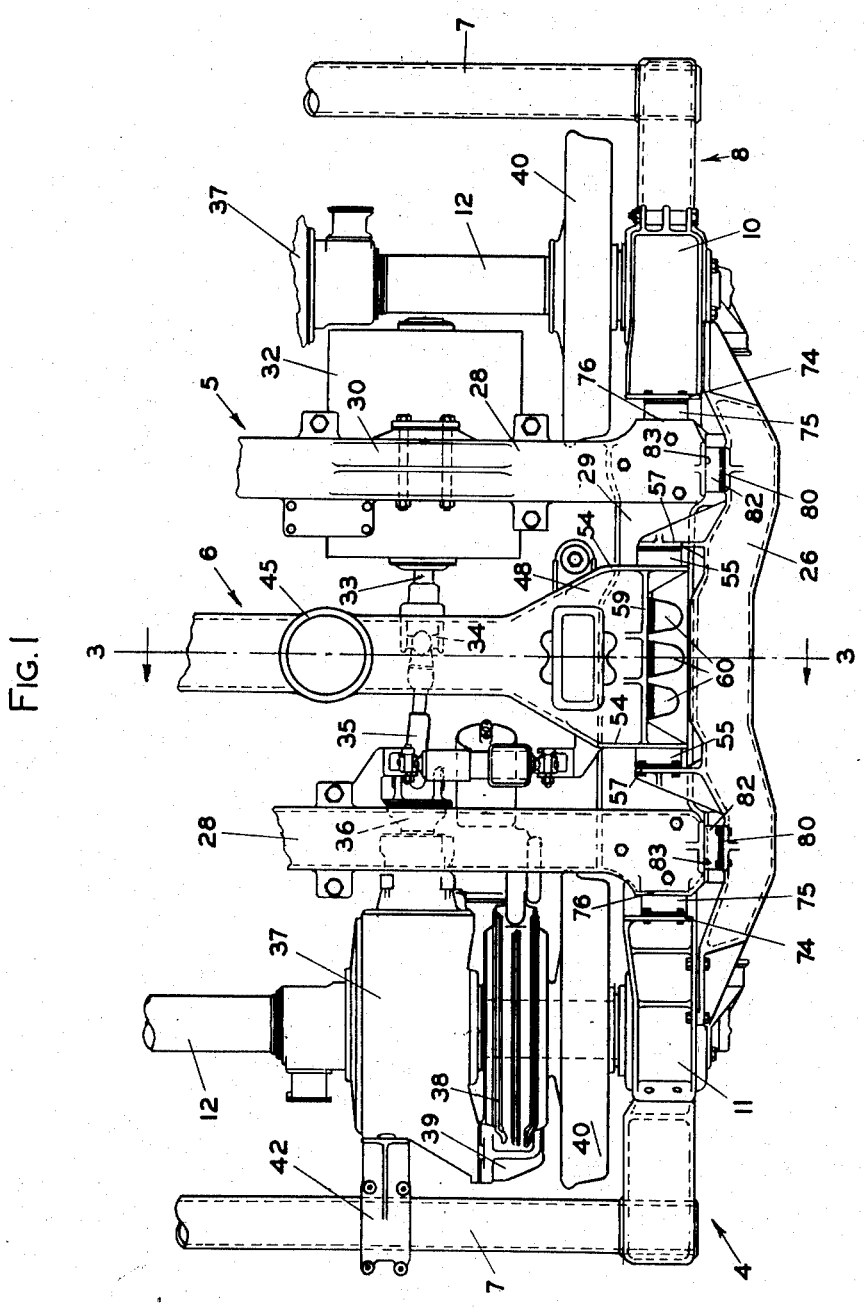
Figure 1 is a partial plan view showing substantially one-half of a rail car truck constructed in accordance with my invention.

The rail car truck shown in the drawings comprises a main frame 4 substantially rectangular, as viewed in plan, a cradle or sub-frame 5, and a bolster 6.

Figure 2:
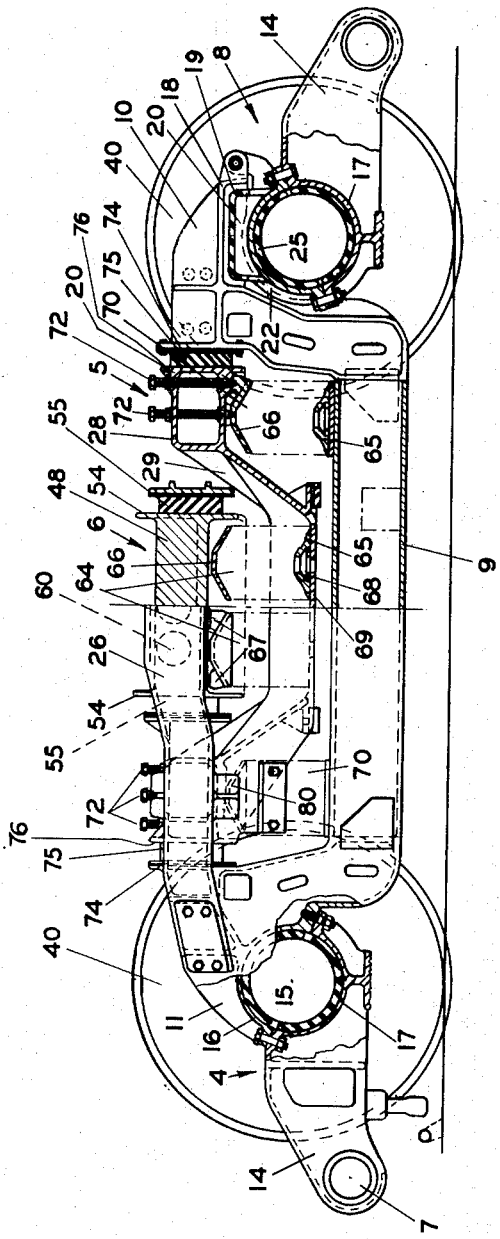
Figure 2 is a side elevational view partly in section of the rail car truck of Figure 1.

The main frame 4 comprises a pair of transversely extending tubular cross members 7 which are secured at their outer ends to main side frame members 8, only one of which at one side of the truck is shown in the drawings, it being understood that the opposite side of the truck is of the same construction as the conventional manner of trucks of this type. The main side frame member 8, as best shown in Figure 2, comprises an intermediate tubular drop center portion 9 having end portions 10 and 11 which lie over the ends of the axle housing arms 12.

The arched end portion 11 at one end of the side frame member 8 is adapted to be clamped directly to the end member 14, in which one end of a tubular member 7 is secured, and a rubber bushing or sleeve 15 is disposed about the end of the axle arm 12 between the two complementary shaft supporting portions 16 and 17 of the arched portion 11 and the end member 14. At the other end of the main side frame member 8 the end portion 10 is formed with an inverted basket-shaped portion 18 which receives an inverted cup-shaped rubber cushioning member 19 which is seated over an extending boss 20 formed integral with a cap-shaped portion 22 fitting over the adjacent end of axle housing arm 12. The adjacent end member 14 of the main side frame member 8, as previously described, includes an axle housing supporting portion 17 to which the complementary cap portion 22 of end member 10 is adapted to be secured as by bolting and which, together with the shaft supporting portions 16 and 17 at the other end of the side frame member 8 provides for supporting of the side frame member 8 on the axle housing arms of the truck. The complementary portions 17 and 22 provide for the support of an annular rubber bushing 25 about the adjacent end of axle housing arm 12, and the inverted cup-shaped rubber member 20 provides a resilient and flexible joint at this corner of the frame to accommodate vertical movement of the end of the axle thereat. The main side frame member 8 at the opposite side of the truck is of the same construction as just described and is arranged with its arch-shaped portion 11 and the end member 14, as shown at the left hand axle housing arm 12, as viewed in Figures 1 and 2, adjacent the other end of the axle housing arm 12 at the right hand side of the drawings, and with its end portion 11 and adjacent end member 14 at the other end of the axle housing arm 12 at the left of Figures 1 and 2. By virtue of such arrangement of the main side frame members 8 with the opposite sides of the main frame of the truck, it will be observed that the rubber cushioning elements 20 provide for the resilient mounting of diagonally opposite corners of the main frame 4 relative to the adjacent ends of the axle housing arms 12. The other pair of diagonally opposite corners of the main frame are supported on the axle housing arm ends by means of the arched end portions 11 and the end members 14 of the main side frame members 6 to provide a relatively rigid connection between these ends of the axle housing arms 12 relative to the frame.

The main frame further comprises a pair of upper tubular side frame members 26 (only one of which is shown in the drawings) which are secured at their opposite ends as by bolting to the upper inner ends of end portions 10 and 11. The upper tubular side frame members 26, as best shown in Figure 1, extend laterally outwardly of the drop center portions 9 of the side frame members 8 and serve primarily, as will presently appear, to provide for the support of suitable means for cushioning of the bolster 6 and limit relative lateral and transverse movement of the latter with respect to the main frame.

The sub-frame 5 is also substantially rectangular in plan and is arranged with the long dimension thereof extending transversely of the main frame 4 and comprises a pair of hollow transverse cross frame portions 28 which at each of their opposite ends are connected by a depending cradle portion 29. The transverse cross frame portions 28 are each formed with opposed arcuate portions, such as shown at 30, for supporting an electric motor 32. Two motors 32 are provided and they are placed in lateral and longitudinal offset positions with respect to each other and face in opposite directions in the conventional manner in trucks of this type. The armature shaft 33 of the electric motor 32 shown in the drawing has connection by means of a universal joint 34 to a shaft 35 which is connected at its other end by a universal joint to the end of a pinion shaft 36 which extends into a gear housing 37 containing ring and pinion gear means by which the axle within the axle housing arm at the left of Figure 1 is driven. A suitable brake mechanism, indicated generally at 38, is contained within a housing 39 bolted to the gear housing 37. The axles within axle housing arms 12 have wheels 40 secured adjacent the opposite ends thereof with the wheels 40 being disposed on the inboard sides of the opposite side frame members 8 of the main frame. The gear housing 37 for the left hand axle, as shown in the drawing, is supported against torque reaction caused by acceleration or braking of the rail car truck by a bracket 42 which is bolted, or otherwise suitably secured to housing 37 and is provided with cap members embracing the adjacent transverse cross frame member 7. The parts above described for the left hand axle are, of course, duplicated for the right hand axle.

The bolster 6, as shown most clearly in Figures 1 and 3, is provided with an intermediate king pin supporting portion 45 for receiving the king pin 46 of the car body 47 of the vehicle illustrated in dot and dash lines in Figure 3. The bolster 6 is provided at its opposite ends with enlarged outer end portions 48, one of which is shown in the drawings. The bolster inwardly of the end portions 48 thereof carries a pair of brackets 49, one of which is best shown in Figure 3. The bracket 49, as shown in Figure 3, is bolted to the bolster and provides for rotatably supporting a roller 50 which is adapted to have rolling engagement with a plate member 52 secured beneath the car body 47 to provide for relative rotation of the car body with respect of the rail car truck, and to limit lateral rocking movement of the car body about the king pin 46. The end portions 48 of the bolster 6 are provided with spaced-apart vertical flanges 54 which bear against rubber blocks 55 secured to spaced-apart flanges 57 formed integral with the upper top side frame members 26 and projecting inwardly from the sides of the rail car truck. The outer end portions 48 of the bolster 6, as shown in Figures 1 and 3, are each further formed with a web flange 59 extending transversely between the flanges 54 thereof and the flange 59 provides for the support of a plurality of rubber bumpers 60 which are adapted to abut against the inner vertical surface 62 of the intermediate portion of the adjacent top side frame member 26 to limit and cushion movement of the bolster transversely of the truck.

The opposite outer end portions 48 of the bolster 6 are each adapted to be supported in the cradle portions 29 of the sub-frame or cradle member 28 by a pair of resilient supporting means, such as shown at 64. Preferably, the resilient supporting means 64 each comprise a vertical stack of alternate thin substantially frusto-conical metal plates and rubber disks arranged between upper and lower end members 65 and 66. The lower end member 65, as shown, is seated upon a disk member 68 fixed to the base panel portion 69 of the cradle 29. The pair of resilient means 64 at each of the bolster ends 48 provide for supporting the vertical load of the car body and transmit such load to the sub-frame or cradle 28.

The sub-frame or cradle 28 at the four corners thereof is resiliently supported on the main frame by resilient supporting means 70. The several resilient means 70 are of the same construction as the resilient supporting means 64, above described, and as shown in Figure 2. A plurality of adjusting bolts, shown at 72, extend through the transverse frame portions 28 of the sub-frame 5 and have engagement with the upper end members 66 for adjusting the sub-frame 5 vertically relative to the main frame 4. The end plate members 65 of the resilient supporting means 70, as shown, are adapted to be supported adjacent the outer ends of the drop center portions 9 of the side frame members 8. Thus, the load of the car body supported by the bolster is transmitted through resilient supporting means 64 to the sub-frame or cradle 28 and from the latter to the main frame 4 through resilient supporting means 70. The main frame 4, as above described, is mounted on the axle housing arms 12 and through which the load is transmitted to the axles carrying the wheel 40.

The end portions 10 and 11 of the side frame members 8, as shown, are provided with vertical flanges 74 and these flanges each have a rubber block member 75 suitably secured thereto. The sides of the transverse frame portions 28 adjacent their outer ends are formed with flat surfaces 76 which are adapted to abut the rubber blocks 75 and cushion lateral movement of the sub-frame or cradle 5 with respect to the main frame 4. The upper side frame members 26, between the ends thereof secured to the end portions 10 and 11 and the inwardly extending flanges 57 thereof, are provided with flanges 80 to each of which a rubber block member 82 is secured and which rubber block members 82 are adapted to have engagement with end surfaces 83 at the outer ends of the transversely extending tubular transverse frame portions 28 of the sub-frame or cradle 5 for cushioning the sub-frame or cradle 5 against movement transversely of the main frame 4 of the rail car truck.

In the rail car truck, as above described, it will be observed, therefore, that the bolster 6 is resiliently supported at its opposite end portions 48 upon the vertically extending resilient supporting means 64 and that the bolster is cushioned against lateral and transverse movement by the rubber blocks 55 and end bumper members 60, respectively. Thus, the bolster is cushioned for movement in all directions with respect of the sub-frame or cradle 5. The sub-frame or cradle 5 is cushioned against vertical relative movement with respect of the main frame 4 by means of the resilient supporting means 70, one disposed at each of the four corners of the sub-frame or cradle 5 on the main frame 4, and the cradle or sub-frame 5 is further cushioned against lateral and transverse movement with respect of the main frame 4 by the rubber blocks 75 and 80. By virtue of the above construction, provision is made for absorbing longitudinal forces in the truck during acceleration and deceleration and also for cushioning relative movement of the main frame, the sub-frame or cradle 5 and the bolster 6 with respect to each other, due to track irregularities and the like for eliminating the shocks of any of such forces from being transmitted to the car body.

While I have shown and described what I consider to be a preferred embodiment of my invention, it will be understood that various modifications and rearrangements may be made therein without departing from the spirit and scope of my invention.

I claim:

1. A rail car truck comprising a main frame having side frame members, a sub-frame between said side frame members extending transversely of said main frame, first resilient supporting means between said sub-frame and said main frame for cushioning said sub-frame for vertical movement relative to said main frame, second resilient means between said main frame and said sub-frame for cushioning lateral movement of the latter relative to said main frame, third resilient means between said main frame and said sub-frame for cushioning transverse movement of the latter relative to said main frame, a bolster extending transversely of said main frame and lying within said sub-frame, fourth resilient means between said sub-frame and said bolster for cushioning the latter for relative vertical movement with respect to said sub-frame, fifth resilient means between said main frame and said bolster for cushioning lateral movement of the latter relative to said main frame, and sixth resilient means between said main frame and said bolster for cushioning transverse movement of the latter relative to said main frame.

2. A rail car truck comprising a main frame having main side frame members having drop center portions intermediate the ends thereof, upper side frame members secured to said main side frame members above the drop center portions thereof, a substantially rectangular sub-frame extending transversely of said main frame between said upper side frame members, resilient means for vertically supporting each of the corners of said sub-frame on said main side frame members, resilient means between the corners of said sub-frame and said main frame for cushioning said sub-frame against lateral and transverse movement relative to said main frame, a bolster extending transversely of said main frame between said upper side frame members, said sub-frame having cradle portions at the ends thereof, resilient means between said cradle portions and the ends of said bolster for vertically supporting the latter, resilient means between the ends of said bolster and said upper side frame members for cushioning said bolster against transverse movement relative to said main frame, and additional resilient means between the sides of said bolster at the ends thereof and said upper side frame members for cushioning said bolster against lateral movement relative to said main frame.

3. A rail car truck comprising a main frame having main side frame members provided with drop center portions intermediate the ends thereof, upper side frame members secured to said main side frame members above the drop center portions thereof, a substantially rectangular sub-frame extending transversely of said main frame between said upper side frame members, first resilient means disposed between the corners of said sub-frame and the drop center portions of said main side frame members for supporting said sub-frame vertically on said main frame, a bolster extending transversely of said main frame between said upper side frame members, said sub-frame having cradle portions at the ends thereof disposed above the drop center portions of said main side frame members, and resilient means between the ends of said bolster and the cradle portions of said sub-frame intermediate and in lengthwise alignment with said first resilient means between said sub-frame and said main frame.

4. The rail car truck of claim 3 characterized by the provision of resilient means between the ends of said sub-frame at the corners thereof and the adjacent portions of said upper side frame members for cushioning transverse movement of said sub-frame.

5. The rail car truck of claim 3 characterized by the provision of resilient means between the sides of said sub-frame at the corners thereof and the adjacent portions of said main side frame members at the ends of the drop center portions thereof for cushioning lateral movement of said sub-frame relative to said main frame.

6. The rail car truck of claim 3 characterized by the provision of resilient means between the ends of said sub-frame at the corners thereof and the adjacent portions of said upper side frame members for cushioning transverse movement of said sub-frame, and further by the provision of resilient means between the sides of said sub-frame at the corners thereof and the adjacent portions of said main side frame members at the ends of the drop center portions thereof for cushioning lateral movement of said sub-frame relative to said main frame.

7. A rail car truck comprising a main frame having main side frame members with dropped center portions intermediate the ends thereof, upper side frame members secured to said main side frame members and disposed above and laterally outwardly of said drop center portions of said main side frame members, a substantially rectangular sub-frame extending transversely of said main frame between said upper side frame members and having the corners thereof overlying the drop center portions of said main side frame members, first resilient supporting means extending between each of the corners of said sub-frame and said drop center portions of said main side frame members, the longitudinal axes of said first resilient supporting means extending vertically, second resilient means between the ends of said sub-frame and said upper side frame members for cushioning relative transverse movement of said sub-frame with respect to said main frame, third resilient means between the sides of said sub-frame at the corners thereof and the end portions of said main side frame members above the ends of the drop center portions thereof for cushioning said sub-frame against lateral movement with respect to said main frame, said sub-frame having cradle portions at its opposite ends, a bolster extending transversely of the main frame and having end portions overlying said cradle portions of said sub-frame, resilient supporting means extending vertically between the ends of said bolster and the cradle portions of said sub-frame, resilient means between the sides of said bolster at the ends thereof and said upper side frame members, and resilient means between the outer ends of said bolster and said upper side frame members.

ALFRED O. WILLIAMS.

References Cited in the file of this patent

UNITED STATES PATENTS

| Number | Name | Date |
|---|---|---|
| 2,184,102 | Piron | Dec. 19, 1939 |
| 2,208,425 | Kjolseth | July 16, 1940 |
| 2,231,195 | Piron | Feb. 11, 1941 |
| 2,316,046 | Buckwalter | Apr. 6, 1943 |
| 2,347,500 | Parke | Apr. 25, 1944 |
| 2,355,104 | Pflager | Aug. 8, 1944 |
| 2,394,547 | Hickman | Feb. 12, 1946 |
| 2,402,501 | Ledwinka | June 18, 1946 |